United States Patent [19]

Yukawa et al.

[11] 3,920,753

[45] Nov. 18, 1975

[54] METHOD OF PRODUCING GLYCOLALDEHYDE

[75] Inventors: Toshihide Yukawa, Kawasaki; Hachiro Wakamatsu, Musashino, both of Japan

[73] Assignee: Ajinomoto Co., Inc., Tokyo, Japan

[22] Filed: May 30, 1974

[21] Appl. No.: 474,616

[30] Foreign Application Priority Data

June 12, 1973 Japan................................ 48-66020

[52] U.S. Cl. ............................................... 260/602
[51] Int. Cl.² ........................................ C07C 47/19
[58] Field of Search................................... 260/602

[56] References Cited

UNITED STATES PATENTS 2,402,566   6/1946   Milas ................................. 260/602

*Primary Examiner*—Raymond V. Rush
*Assistant Examiner*—D. B. Springer
*Attorney, Agent, or Firm*—Hans Berman; Kurt Kelman

[57] ABSTRACT

Glycolaldehyde is formed in economically significant yields by hydroformylation of formaldehyde in the presence of cobalt-bearing catalysts which form cobalt carbonyl under the reaction conditions.

4 Claims, No Drawings

METHOD OF PRODUCING GLYCOLALDEHYDE

This invention relates to the synthesis of glycolaldehyde, and particularly to a method of producing glycolaldehyde under conditions suitable for industrial operation.

Glycolaldehyde is a known intermediate in the production of serine, but did not offer a viable route to the amino acid because glycolaldehyde had to be prepared from glycol or dihydroxymaleic acids at an impractically high cost.

It has now been found that glycolaldehyde is readily produced at low cost by hydroformylation of formaldehyde in the presence of a cobalt-bearing catalyst in a reaction which may be summarized by the equation

$$HCHO + H_2 + CO \rightarrow CH_2OH\text{--}CHO$$

Formaldehyde may be introduced into the reaction zone as such or it may be generated under the reaction conditions from its aqueous solutions, from paraformaldehyde and other polymers of formaldehyde. At least some useful amounts of glycolaldehyde are formed when the mole ration of carbon monoxide and hydrogen in the reaction zone is between 1:19 and 19:1, although a range from 1:4 to 4:1 is normally more advantageous. The most suitable ratio may be found within this narrower range according to specific conditions including the cost of the starting materials, and the equipment available for performing the reaction and for further processing the reaction product.

While the reaction pressure is not critical, efficient production of glycolaldehyde requires a pressure of 10 to 500 kg/cm² or atmospheres. Inert gases, such as nitrogen, methane, ethane, carbon dioxide, and argon may be present without affecting the result as long as the combined partial pressures of carbon monoxide and hydrogen are within the range stated. Catalyst poisons are to be avoided if it is intended to perform the reaction for an extended period.

The reaction may be carried out at an ambient temperature as low as 15°C in the presence of large amounts of cobalt carbonyl, but it is normally preferred to maintain a minimum temperature of 50°C at which cobalt carbonyl is formed from other cobalt-bearing materials in the presence of carbon monoxide. A reaction temperature of 250°C should not be exceeded to avoid conversion of some glycolaldehyde to ethyleneglycol, and a temperature not exceeding 200°C is normally preferred.

All cobalt catalysts known to be useful for carbonylation and hydroformylation are useful for the purpose of this invention, that is, all cobalt-bearing materials which yield cobalt carbonyl in the presence of carbon monoxide under the conditions of temperature and pressure under which the instant invention is performed. Suitable sources of cobalt carbonyl thus include metallic cobalt, particularly Raney cobalt, the hydroxides and oxides of cobalt, and most inorganic and organic salts. Cobalt carbonyls, of course, may be introduced into the reaction zone as such. Cobalt salts which are converted to cobalt carbonyl in the presence of carbon monoxide at elevated temperature and pressure, and which are suitable sources of cobalt carbonyl, include the acetate, benzoate, carbonate, iodide, citrate, formate, nitrate, oleate, oxalate, and tartrate, but this listing is far from complete.

Known promoters for hydroformylation and carbonylation, which are compounds of phosphorus, nitrogen, oxygen, or halogen may be employed jointly with the cobalt-bearing catalyst materials. The amount of cobalt present in the reaction zone as a catalyst varies greatly with the nature of the cobalt compound, and useful results may be achieved with as little as 1/10,000 mole cobalt per mole of formaldehye in the reaction zone. Equimolar amounts of cobalt and formaldehyde are needed for good results at room temperature.

The reaction represented by the above equation proceeds without solvents, but is preferably carried out in an inert, liquid solvent. Suitable solvents include, but are not limited to, ketones (acetone, acetophenone, cyclohexanone), nitriles (acetonitrile, benzonitrile), carboxylic acids (formic acid), N-disubstituted amides (dimethylformamide, N-methylpyrrolidone, dimethylacetamide), higher alcohols (cyclohexanols, 2-ethylhexanol), tetrasubstituted ureas (N,N,N',N'-tetramethylurea), but also water and ethylene carbonate. The preferred solvents are those having a specific inductive capacity of not less than 15 at 25°C when determined in the manner set forth in National Bureau of Standards Circular 514. When non-polar solvents, such as benzene, are employed, they are preferably mixed with polar solvents, such as those enumerated above, or with inert polar solutes making the specific inductive capacity of the reaction medium not less than 15 at 25°C. Suitable polar solutes include succinonitrile, terephthalonitrile, N,N-dimethylbenzamide, N-acetylsarcosine, and N-methylacetanilide. Both the reaction rate and the reaction yield benefit from a polar reaction medium.

The synthesis of glycolaldehyde according to this invention may be carried out batchwise or in continuous operation, and the mode of operation as well as the specific operating conditions will determine whether the product should be recovered from the reaction mixture and in what manner, several conventional methods readily suggesting themselves for this purpose.

The following Examples further illustrate this invention. A 100 ml stainless steel pressure vessel equipped with an electromagnetic stirrer was the reactor in Example 1 to 5. The amounts of carbon monoxide and hydrogen employed in the several hydroformylation reactions are given in mole or volume ratios.

EXAMPLE 1

3.0 g Paraformaldehyde, 0.6 g dicobalt octacarbonyl, and 50 ml acetonitrile were placed in the reactor which was charged to a pressure of 200 kg/cm² with a 1:2 mixture of carbon monoxide and hydrogen. The contents of the reactor were stirred at 110°C for 20 minutes, whereby 63 millimole gas was absorbed.

A faintly yellow, clear liquid was poured from the reactor. An aliquot was subjected to gas chromatography (80°C, He), and the reaction mixture was found to contain 10.1 millimole glycolaladehyde (10% yield based on the formaldehyde charged).

Another aliquot of the liquid was reacted with phenylhydrazine. The product was isolated by gas chromatography, and identified as glyoxalphenylhydrazone by mass and NMR spectra.

EXAMPLE 2

3.0 g Paraformaldehyde, 0.6 g dicobalt octacarbonyl, 50 ml acetone, and 1.8 ml water were placed in the reactor which was charged to a pressure of 200 kg/cm² with a 1:1 mixture of carbon monoxide and hydrogen. The contents of the reactor were stirred at 110°C for 20 minutes, whereby 81 millimole gas was absorbed.

The reaction mixture was analyzed as in Example 1, and was found to contain 20 millimole glycolaldehyde (20% yield based on the formaldehyde charged).

EXAMPLE 3

3.0 g Paraformaldehyde, 0.6 g dicobalt octacarbonyl, 50 ml dioxane, and 3.65 g dimethylformamide were placed in the reactor which was charged to a pressure of 200 kg/cm$^2$ with a 1:1 mixture of carbon monoxide and hydrogen. The contents of the reactor were stirred at 120°C for 20 minutes, whereby 132 millimole gas was absorbed.

The reaction mixture was analyzed as in Example 1, and was found to contain 25 millimole glycolaldehyde (25% yield based on the formaldehyde charged).

EXAMPLE 4

3.0 g Paraformaldehyde, 0.6 g dicobalt octacarbonyl, 50 ml dioxane, 4.2 g dimethylacetamide, and 1.8 g water were placed in the reactor which was charged to a pressure of 200 kg/cm$^2$ with a 1:1 mixture of carbon monoxide and hydrogen. The contents of the reactor were stirred at 120°C for 20 minutes, whereby 117 millimole gas was absorbed.

The brown, clear reaction mixture was poured from the reactor and was found to contain 50 millimole glycolaldehyde (50% yield based on the formaldehyde charged).

EXAMPLE 5

8.1 g 37% Aqueous formaldehyde solution containing 100 millimole formaldehyde, 4.2 g dimethylacetamide, 50 ml dioxane, and 2 g cobalt iodide were placed in the reactor which was charged to a pressure of 200 kg/cm$^2$ with a 1:1 mixture of carbon monoxide and hydrogen. The contents of the reactor were stirred at 140°C for 60 minutes, whereby 147 millimole gas was absorbed.

The reddish brown, clear mixture was poured from the reactor and was found to contain 21 millimole glycolaldehyde (21% yield based on the formaldehyde charged).

An aliquot of the reaction mixture was distilled, and glycolaldehyde was recovered as a fraction having a boiling point of 110° to 120°C/12 mmHg.

What is claimed is:

1. A method of producing glycolaldehyde which comprises the steps of holding formaldehyde in a reaction zone in contact with carbon monoxide and hydrogen in an inert liquid solvent in the presence of an effective amount of cobalt carbonyl until said glycolaldehyde is formed, the mole ratio of said carbon monoxide to said hydrogen in said reaction zone being between 1:19 and 19:1, the combined pressure of said carbon monoxide and of said hydrogen in said reaction zone being between 10 and 500 kg/cm$^2$, the temperature of said reaction zone being between 15° and 250°C, and removing the formed glycolaldehyde from said reaction zone.

2. A method as set forth in claim 1, wherein said temperature is 50° to 200°C.

3. A method as set forth in claim 2, wherein the mole ratio of said carbon monoxide and said hydrogen is between 1:4 and 4:1.

4. A method as set forth in claim 1, wherein said solvent has a specific inductive capacity of not less than 15 at 25°C.

* * * * *